US005986910A

United States Patent [19]

Nakatsuka

[11] Patent Number: 5,986,910

[45] Date of Patent: Nov. 16, 1999

[54] VOLTAGE-CURRENT CONVERTER

[75] Inventor: Junji Nakatsuka, Takatsuki, Japan

[73] Assignee: Matsushita Electric Industrial Co., Ltd., Kadoma, Japan

[21] Appl. No.: 09/196,949

[22] Filed: Nov. 20, 1998

[30] Foreign Application Priority Data

Nov. 21, 1997 [JP] Japan .................................... 9-321704

[51] Int. Cl.[6] ................................ H02M 7/00; G05F 3/16

[52] U.S. Cl. ............................................... 363/73; 323/316

[58] Field of Search ............................... 363/73; 323/312, 323/313, 314, 315, 316

[56] References Cited

U.S. PATENT DOCUMENTS

| | | | |
|---|---|---|---|
| 5,629,614 | 5/1997 | Choe et al. | 323/315 |
| 5,859,528 | 1/1999 | Honma | 323/315 |
| 5,883,798 | 3/1999 | Yamaguchi | 363/73 |

FOREIGN PATENT DOCUMENTS

| | | |
|---|---|---|
| 4-40373 | 2/1992 | Japan . |
| 6-350355 | 12/1994 | Japan . |

*Primary Examiner*—Y. J. Han
*Attorney, Agent, or Firm*—Rosenthal & Osha L.L.P.

[57] ABSTRACT

The present invention provides a voltage-current converter which can decrease the circuit scale excluding the capacitor for the stability operation, and which can select one from among two or more output currents is disclosed. Constant voltage Vr generated in constant voltage source 90 is supplied to non-reversing input of op-amp 10, output Vo of op-amp 10 returns to the reversing input of op-amp 10, and the output Vo is connected with resistance R. The gate voltage Va of the P channel MOS transistor and the gate voltage Vb of the N-channel MOS transistor which configure the output circuit of the op-amp 10 is outputted and is supplied to the constant current generation circuit 30. Constant current generation circuit 30 outputs constant current I2 from these voltages Va and Vb.

6 Claims, 11 Drawing Sheets

VOLTAGE-CURRENT CONVERTER

BACKGROUND OF THE INVENTION

1. Field of the Invention

The present invention relates to a voltage-current converter for providing a constant current from the voltage generated in a constant voltage source.

2. Description of the Prior Art

To improve mobility and allow battery drive, many types of equipment use semiconductor circuits driven by low voltage, especially, integrated circuits which contain analog parts and digital parts mixed on the same substrate.

These semiconductor circuits often require a voltage-current converter to generate constant current, which is used for bias circuits such as an op-amp and a comparator, from voltage generated by the constant voltage source, which uses, for example, a band gap reference circuit.

In the below description, a conventional voltage-current converter is explained with reference to FIG. 11. One example of the conventional voltage-current converter is shown by reference numeral 100 in FIG. 11. Constant voltage Vr based on VSS generated in a constant voltage source 90 is supplied to the reversing input of op-amp 103. Output Vg of op-amp 103 is supplied to the gate of P-channel of two MOS (metal-oxide semiconductor) transistors MP101 and MP102 which have the same channel-width and the same channel-length (hereafter, referred to as “same W/L”).

Both sources of these MOS transistors MP101 and MP102 are connected with a high-level power-supply voltage VDD. The drain Vp of MP101 is connected with the one side of resistance R and capacitor C10 connected in parallel, and connected with non-reversing input of op-amp 103. The other side of resistance R and capacitor C10 connected in parallel is connected with VSS which is the low-level power-supply voltage. The drain of MP102 is connected with constant current output terminal Io.

In FIG. 11, 110 shows a basic composition of an op-amp (operation amplifier) comprising CMOS (complementary MOS) formed on the NMOS substrate. This op-amp 110 is supplied with the bias current Ib from the constant current output Io of the above-mentioned voltage-current converter 100.

Next, the operation of the conventional voltage-current converter 100 is explained. The output of op-amp 103 which comprises the voltage-current converter 100 is positively fed back through MP101, and operates as shown by the following equation 1.

$$Vr=Vp \quad \text{(equation 1)}$$

The current I1 which flows through the resistance R is shown by equation 2.

$$I1=Vp/R \quad \text{(equation 2)}$$

Because the same gate voltage Vg is supplied to MP101 and MP102, which are of same W/L, drain currents I2 and I1 of MP101 and MP102 are equal to each other. Therefore, equation 3 results.

$$I2=I1 \quad \text{(equation 3)}$$

The (equation 4) is obtained by (equation 1)–(equation 3).

$$I2=Vr/R \quad \text{(equation 4)}$$

Thus, conventional voltage-current converter 100 generates constant current I2 from constant voltage Vr.

The above-mentioned voltage-current converter had the following faults. Voltage-current converter 100 in FIG. 11 oscillates easily because it uses the positive feedback operation of op-amp 103. The purpose of connecting capacitor C10 with resistance R connected with drain of MP101 in parallel is to maintain the stability operation of op-amp 103 by suppressing this oscillation. Moreover, because the resistance of resistance R and W/L of MP101 and MP102 are fixed when resistance R is built into LSI, the value of the constant current is fixed. In sum, a variable current was not able to be obtained.

SUMMARY OF THE INVENTION

Therefore, with the foregoing in mind, it is an object of the present invention to overcome the problems of a conventional voltage-current converter as above-mentioned, to downsize the circuit scale without the capacitor for the stability operation, and to offer the voltage-current converter which can select one from among two or more output currents.

In order to achieve the objects mentioned above, a voltage-current converter of this invention comprises a constant voltage source, an op-amp to whose non-reversing input terminal said voltage is inputted and to whose reversing input terminal the output signal of the op-amp is fed back. The op-amp has a first transistor and a second transistor which constitute its output circuit, a resistance one terminal of which the output signal of the op-amp is inputted and the other terminal of which the base voltage of the constant voltage source is inputted, a third transistor and a fourth transistor connected parallel to the first transistor and the second transistor of the output circuit of the op-amp. The gate of the third transistor is connected to the gate of the first transistor, the gate of the fourth transistor is connected to the gate of the second transistor. An output current which is obtained from the connected drain terminals of the third transistor and fourth transistor.

The above-mentioned configuration is not prone to oscillation and provides operation stability because the op-amp works as voltage-follower of the negative feedback. Therefore, the conventionally necessary capacitor connected in parallel to resistance R to prevent oscillation becomes unnecessary.

Moreover, it is preferable in the above-mentioned configuration that the transistor pair which may include two or more CMOS circuits is connected with the 1st and 2nd transistor in parallel, one gate of each transistor pair is connected with the gate of the first transistor, the other gate is connected with the gate of the second transistor, the drain node of each transistor pair is connected together, and the output current is obtained from the node.

In this case, a large output current can be obtained compared to the case comprising one transistor pair.

In addition, it is preferable in the above-mentioned configuration that the current controller is added, which current controller changes the output current obtained from the drain node in stages by switching at least a part of two or more transistor pairs by the gate voltage controller to active status or non-active status. Thus, a variable output current which is not fixed can be obtained.

As another configuration to obtain variable output current, the above-mentioned resistance is connected between the output of the op-amp and the base voltage of the constant voltage source through the switching element. In addition, two or more serially connected units of a resistance and switching element are connected in parallel, resistance value of the combined resistance connected between the output of the op-amp and the base voltage of the constant voltage is changed through control of the switching element.

Moreover, the current mirror circuit for the output current reversing can be further provided, connect the drain node of the third and fourth transistor with the reference node of the current mirror circuit, and obtain the constant current output from the output node of the current mirror circuit. As a result, it is possible to output current by converting the current in the flow-out-direction into the current in the flow-in direction.

Moreover, it is preferable to use the band gap reference circuit as a constant voltage source. Because the fluctuation of the output voltage of this circuit to the temperature change is small, the voltage-current converter which used in this circuit does not depend on the temperature and is able to obtain the stable output current.

DESCRIPTION OF THE PREFERRED EMBODIMENTS

Hereinafter the present invention will be described by way of embodiments with reference to the accompanying drawings.

Embodiment 1

Figure 1:
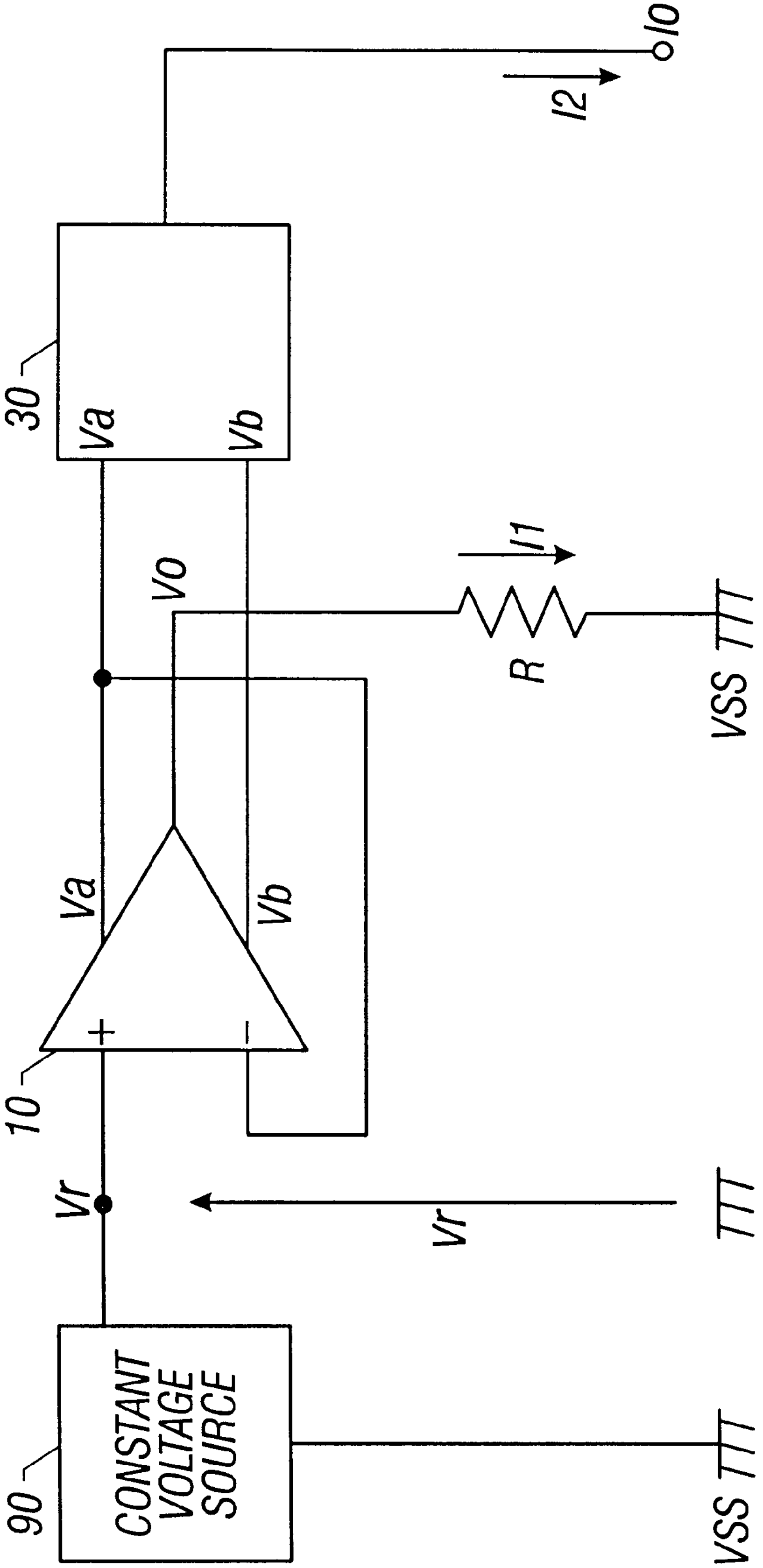
FIG. 1 is a circuit diagram showing the outline of the voltage-current converter of the first embodiment of this invention.

FIG. 1 shows the outline of the voltage-current converter of the first embodiment of this invention. Voltage Vr where constant voltage source 90 is generated is supplied to non-reversing input of op-amp 10. Output Vo of op-amp 10 is connected with resistance R and connected with the reversing input of op-amp 10. The gate voltage Va of the P channel MOS transistor which includes the output circuit of the op-amp 10 is outputted, and supplied to constant current generation circuit 30. Similarly, gate voltage Vb of the N channel MOS transistor which includes the output circuit of the op-amp 10 is outputted, and supplied to constant current generation circuit 30. Constant current generation circuit 30 generates the constant current I2 from two supplied voltages Va and Vb and outputs the constant current I2 from terminal Io.

Figure 2:
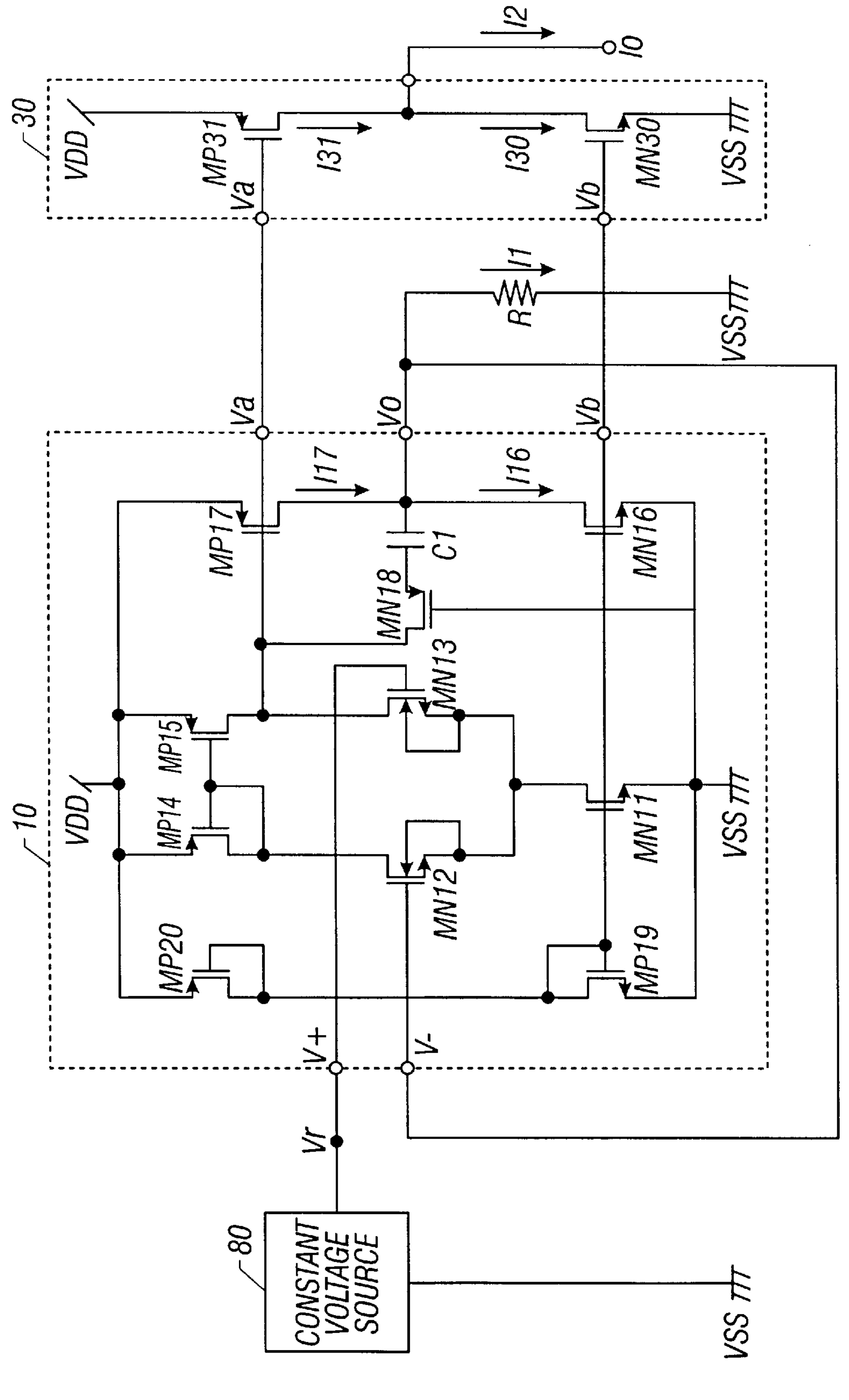
FIG. 2 is a circuit diagram showing the details of the voltage-current converter in FIG. 1.

FIG. 2 shows a detailed circuit diagram of the above-mentioned voltage-current converter. The op-amp 10 comprises basic CMOS formed on NMOS substrate. The gate voltage Va of the P channel MOS transistor MP17 and the gate voltage Vb of the N channel MOS transistor MN16 which includes the output circuit of the op-amp 10 are outputted to the outside of the op-amp 10, and these are inputted to constant current generation circuit 30. The constant current generation circuit 30 includes the MOS transistor MN30 and MP31 whose W/L is same with those of NN16 and MP17. Moreover, both source voltage potential of MN30 and MN16 is VSS, and both source voltage potential of MP31 and MP17 is VDD. In addition, both gate voltage potential of the MN30 and MN16 is Vb, and both gate voltage potential of the MP31 and MP17 is Va.

In the voltage-current converter in this embodiment, the op-amp 10 is an active element which has sufficient phase margin, and output Vo of op-amp 10 is configured with negative feedback connected directly with the reversing input of the op-amp 10, that is, op-amp 10 is in a voltage-follower configuration. Therefore, the voltage-current converter of this embodiment is not prone to oscillation and provides the operation stability. Therefore, conventionally necessary capacitor connected in parallel to resistance R to prevent oscillation is unnecessary in this embodiment's circuit. In this embodiment, op-amp 10 operates in accordance with the following equation 5.

$$Vr=Vo \quad \text{(equation 5)}$$

Further, current I1 which flows to resistance R is shown by equation 6.

$$I1=Vo/R \quad \text{(equation 6)}$$

The drain current of MN16 and MP17 in op-amp 10 is denoted by I16 and I17 respectively, and current of the resistance R which connected between the output terminal Vo of the op-amp 10 and the VSS is denoted by I1, the relation between these three currents is shown by equation 7.

$$I17=I16+I1 \quad \text{(equation 7)}$$

Similarly, the drain current of MN30 and MP31 in the constant current generation circuit 30 is denoted by I30 and I31 respectively, and current of the output current of the constant current generation circuit 30 is denoted by I2, the relation between these three currents is shown by equation 8.

$$I31=I30+I2 \quad \text{(equation 8)}$$

As mentioned above, because the source voltage, the gate voltage and W/L of MN30 and MN16 are the same, and because the source voltage, the gate voltage and W/L of MP31 and MP17 are the same, the relation of I16, I17, I30 and I31 is shown by equations 9 and 10.

$$I30=I16 \quad \text{(equation 9)}$$

$$I31=I17 \quad \text{(equation 10)}$$

Equation 11 is obtained by the (equation 5)–(equation 10).

$$I2=Vr/R \quad \text{(equation 11)}$$

Thus, the voltage-current converter in this embodiment can obtain the constant current I2 from the constant voltage Vr. In the above-mentioned description, with regard to both MN16 and MN30, and both MP17 and MP31, both W/L are the same. However, there is no need to limit the W/L to the same, it is enough if the relation (W/L)=m·(W/L) is satisfied (m stands for the real number). The output current I2 can, therefore, by described shown in equation 12.

$$I2=m\cdot(Vr/R) \quad \text{(equation 12)}$$

In this case, an output current equal to m times the current which flows to resistance R can be obtained.

Embodiment 2

Figure 3:
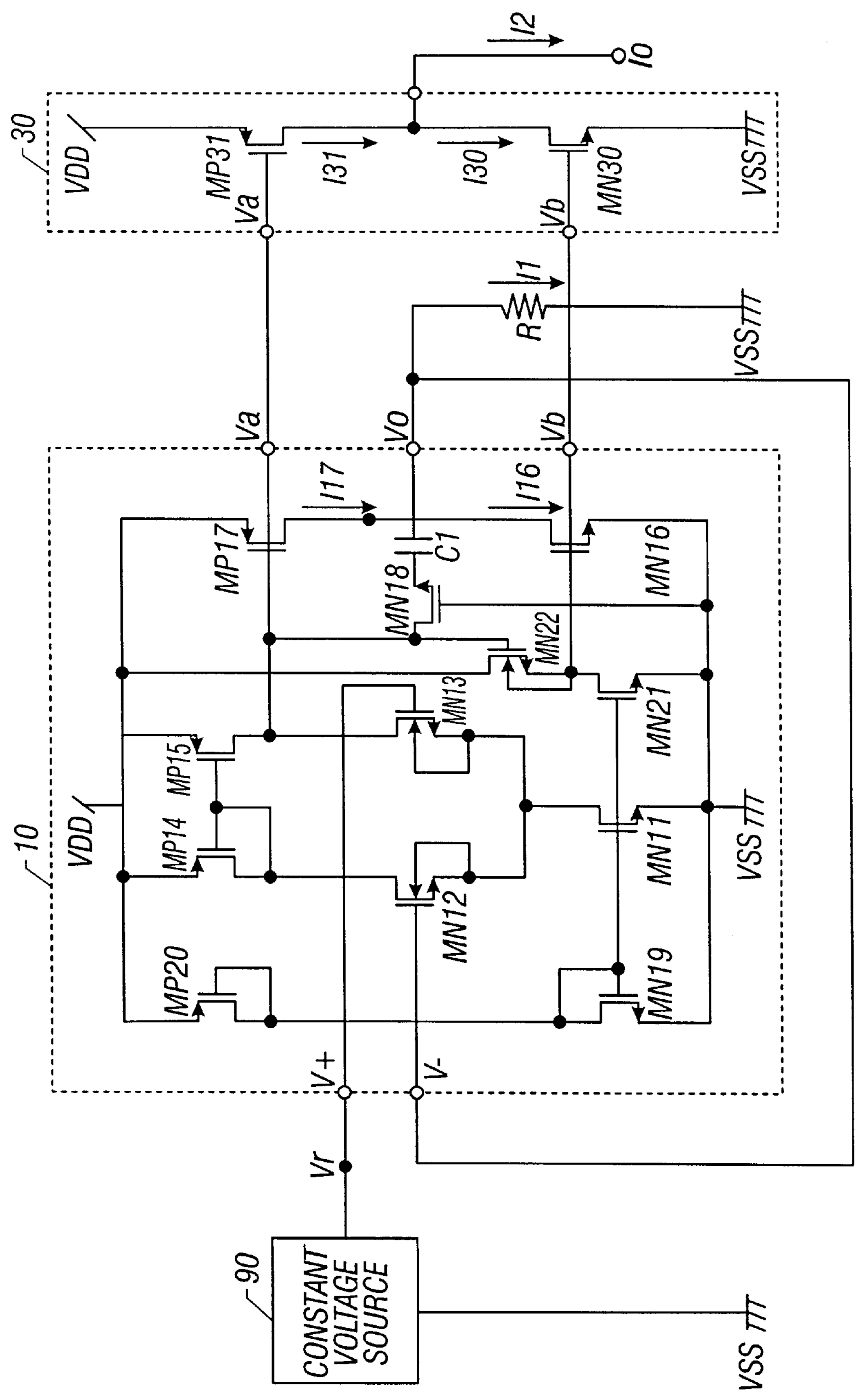
FIG. 3 is a circuit diagram showing the voltage-current converter of the second embodiment of this invention.

FIG. 3 shows details of the voltage-current converter of the second embodiment of this invention. The op-amp 10 of this embodiment is a version of the output circuit of op-amp 10 shown in FIG. 2 redesigned to operate class AB. In short, the gate voltage Vb of MN16 is generated by shifting the level of the gate voltage Va of the MP17 with MN21 and MN22.

Equation (11) or (12) shown with the first embodiment for this embodiment can be satisfied in this second embodiment, and the desirable constant current can be obtained.

Embodiment 3

Figure 4:
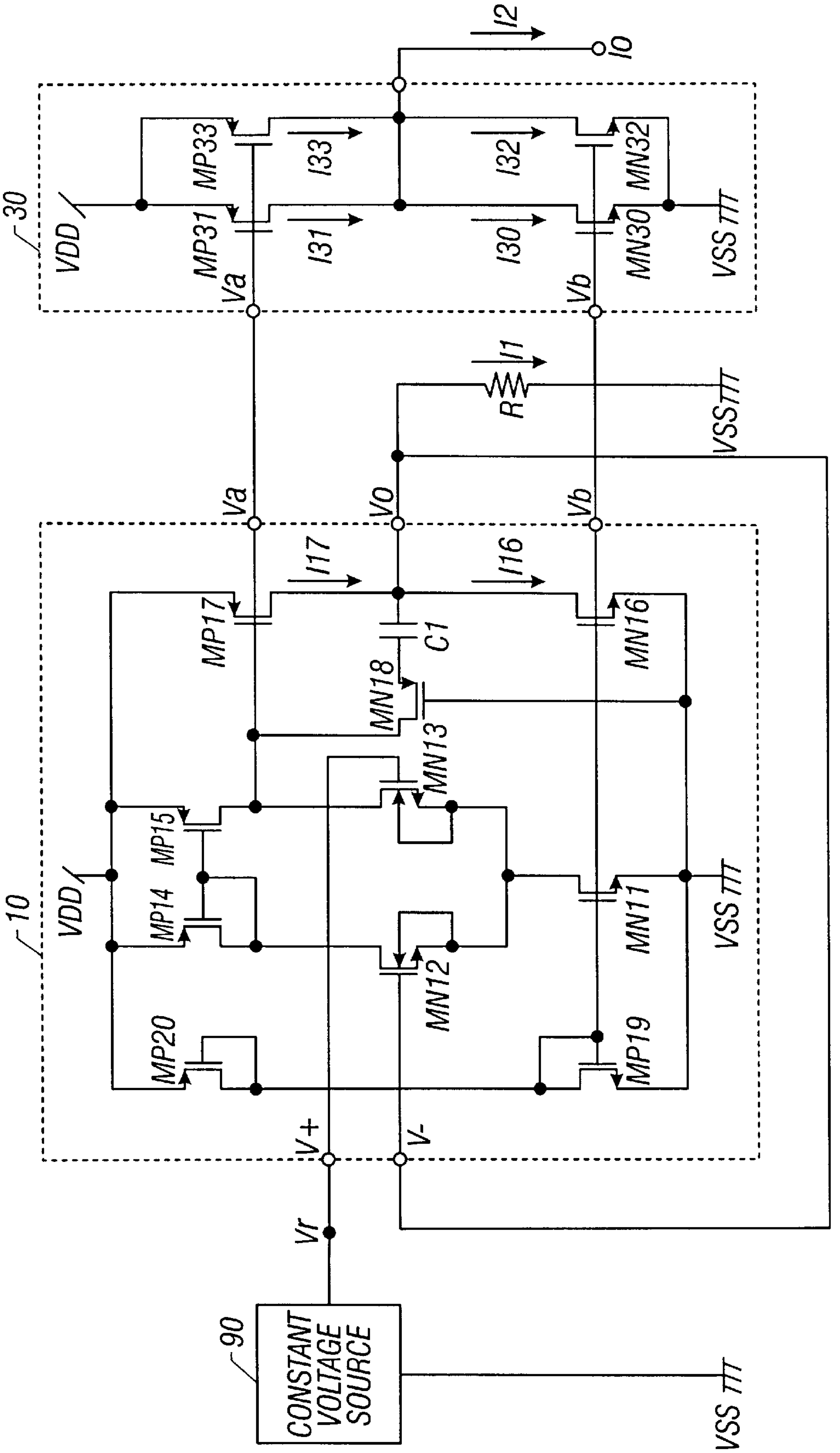
FIG. 4 is a circuit diagram showing the voltage-current converter of the third embodiment of this invention.

FIG. 4 shows details of the voltage-current converter of the third embodiment of this invention. The constant current generation circuit 30 of this embodiment comprises two N channel transistors MN30 and MN32 connected in parallel having the same W/L, and two P channel transistors MP31 and MN33 connected in parallel having the same W/L. The following equations for I30 and I31 are satisfied when the drain current of MN32 and MP33 is denoted by I32 and I33 respectively.

$$I32=I30 \quad \text{(equation 13)}$$

$$I33=I31 \quad \text{(equation 14)}$$

On the other hand, the relation between constant current output I2 and I30–I33 is shown by the next equation.

$$I31+I33=I30+I32+I2 \quad \text{(equation 15)}$$

Therefore, the next equation is obtained from (equation 5), (equation 6), (equation 9), (equation 10), (equation 13), (equation 14), and (equation 15).

$$I2=2\cdot(Vr/R)=2\cdot I1 \quad \text{(equation 16)}$$

Therefore, a constant current I2 equal to twice the current which flows to resistance R can be generated without changing resistance R. Constant current equal to twice the current which flows to resistance R can be obtained when assuming m=2 in (equation 12) described in embodiment 1. However, because the fluctuation of the semiconductor manufacturing, the channel-width, and the channel-length is small, the configuration of this embodiment can more accurately obtain twice the constant current.

In this embodiment, one unit of the transistors MN32 and MP33, which have the same W/L, is connected to a unit the transistors with MN30 and MP31, which have the same W/L. When n units of parallel connection circuit is configured by adding the (n−1) units of transistors are added, the output constant current I2 is described as the next (equation 17).

$$I2=n\cdot(Vr/R) \quad \text{(equation 17)}$$

In this case, constant current equal to n times the current which flows to resistance R will be obtained.

Moreover, it is possible that the output transistor of the constant current generation circuit 30 includes only the single-unit of MN30 and MP31 as with embodiment 1 in FIG. 2, and the output transistors, which have the same W/L as output transistors MN16 and MP17, are added in parallel to the output transistors MN16 and MP17 of the op-amp 10. When the circuit is configured with n units connected in parallel by adding (n−1) units of transistors, the output constant current I2 is described by equation 18.

$$I2=(Vr/R)/n \quad \text{(equation 18)}$$

In this case, the constant current of one/n times the current which flows to resistance R will be obtained.

Embodiment 4

Figure 5:
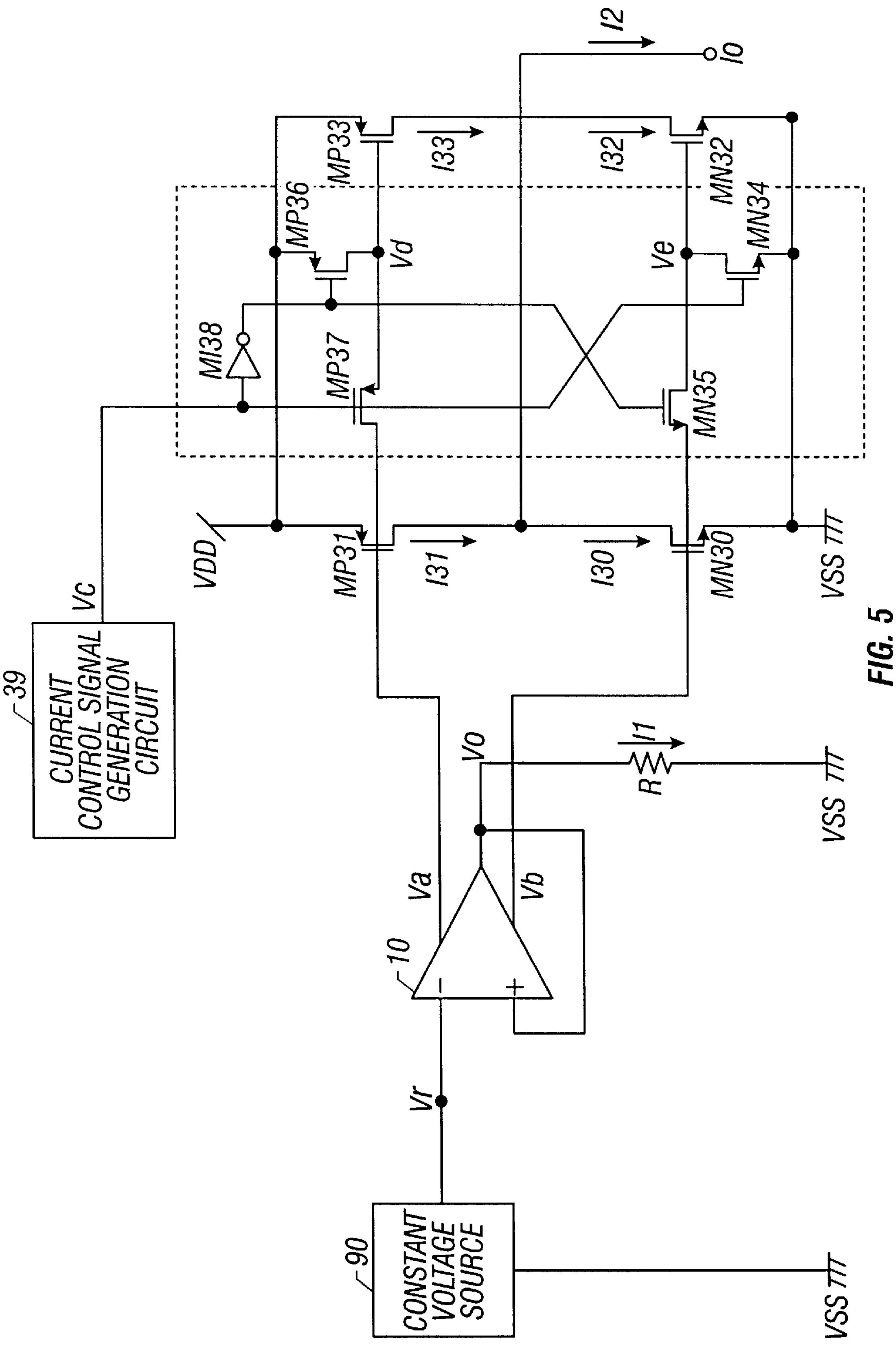
FIG. 5 is a circuit diagram showing the voltage-current converter of the fourth embodiment of this invention.

FIG. 5 shows the voltage-current converter of the fourth embodiment of this invention. The low current generation circuits of this embodiment is the version of the constant current generation circuit 30 of embodiment 3 as shown in FIG. 4. In short, gate voltage Ve of MN32 is switched to either voltage Vb supplied from op-amp 10 or low-level side power-supply voltage VSS with the circuit of MN34 and MN35. Similarly, gate voltage Vd of MP33 is switched to either voltage Va supplied from op-amp 10 or high-level side power-supply voltage VDD with the circuit of MP36 and MP37. And, the current control circuit is equipped which a current control circuit including the current control signal generation circuit 39 which generates control signal Vc by which those switches are controlled and inverter MI38 which reverses this control signal Vc.

This embodiment operates as follows. When the control signal Vc=VSS, MN35 and MP37 turn on, and MN34 and MP36 are turned off. At this moment, because gate voltage Ve of MN32 and gate voltage Vd of MP33 become value shown by (equation 19) and (equation 20) respectively, embodiment 4 operates in the same manner as embodiment 3.

$$Ve=Vb \quad \text{(equation 19)}$$

$$Vd=Va \quad \text{(equation 20)}$$

Therefore, output current I2 is given by the next equation.

$$I2=2\cdot(Vr/R)=2\cdot I1 \quad \text{(equation 21)}$$

On the other hand, when the control signal Vc=VDD, the gate voltage Ve of the MN32 and the gate voltage Vd of the MP33 become the values shown in (equation 22) and (equation 23) respectively, because both MN35 and MP37 are turned off, and both MN34 and MP36 are turned on.

$$Ve=VSS \quad \text{(equation 22)}$$

$$Vd=VDD \quad \text{(equation 23)}$$

Therefore, both MN32 and MP33 turn off, both I32 and I33 become the values shown in (equation 24) and (equation 25) respectively.

$$I32=0(A) \quad \text{(equation 24)}$$

$$I33=0(A) \quad \text{(equation 25)}$$

As a result, output current I2 becomes the values shown in (equation 26).

$$I2=Vr/R=I1 \quad \text{(equation 26)}$$

As above-mentioned, according to this embodiment, constant current I2 equal to or twice the current which flows to resistance R can be selectively obtained without changing the circuit constant by altering of the current control signal generation circuit 39 and the current control circuit.

As a modified example of this embodiment, two or more units of transistors connected in parallel to the MN30 and MP31 are equipped, and respective transistor units can be controlled by current control signal generation circuit and current control circuit. As a result, the arbitrary output current can be selected from among two or more constant currents.

Embodiment 5

Figure 6:
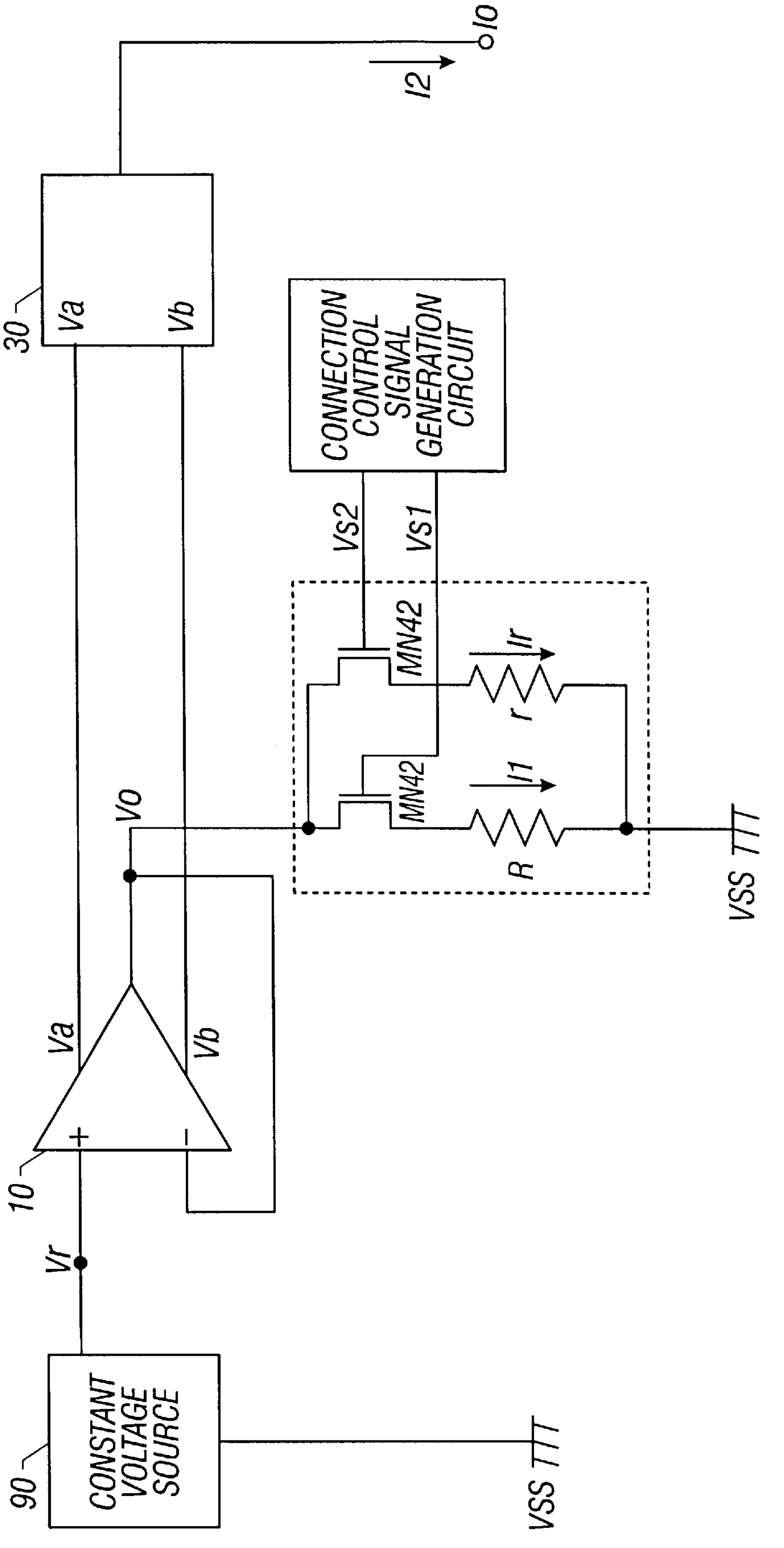
FIG. 6 is a circuit diagram showing the voltage-current converter of the fifth embodiment of this invention.

FIG. 6 shows the voltage-current converter of the fifth embodiment of this invention. In this embodiment 5, transistor MN41 is equipped between output Vo of op-amp 10 and resistance R. The gate voltage Vs1 is supplied from the connection control signal generation circuit 43 to the gate of MN41. Similarly, the series connection of resistance r and transistor MN42 are connected in parallel to the series connection of resistance R and transistor MN41, where the gate voltage Vs2 is supplied from the connection control signal generation circuit 43 to the gate of MN42. The series-parallel connection of resistance R and r and transistor MN41 and MN42 includes resistance select circuit 40.

This embodiment 5 operates as follows. When the control signal Vs1=VDD and Vs2=VSS, the transistor MN41 turns on and the transistor MN42 turns off, the resistance connected between output Vo of op-amp 10 and VSS is only the resistance R, the output current I2 becomes the value shown in (equation 27), which is derived from (equation 11).

$$I2=Vr/R \qquad \text{(equation 27)}$$

When the control signal Vs1=VSS and Vs2=VDD, the transistor MN41 turns off and the transistor MN42 turns on, the resistance connected between output Vo of op-amp 10 and VSS is only the resistance r, the output current I2 becomes the values shown in (equation 28) led by (equation 11).

$$I2=Vr/r \qquad \text{(equation 28)}$$

When the control signal Vs1=VDD and Vs2=VDD, the transistor both MN41 and MN42 turn on, the resistance connected between output Vo of op-amp 10 and VSS is the resistance R and r connected parallel to each other, the output current I2 becomes the value shown in (equation 29), which is derived from (equation 11).

$$I2=Vr/R+Vr/r \qquad \text{(equation 29)}$$

Therefore, according to this embodiment 5, three kinds of constant currents I2 can be selectively obtained without changing the circuit constant by altering of the connection control signal generation circuit 39 and the resistance select circuit 40.

If the parallel connection control is applied to three or more resistances, the arbitrary output current can be selected from among the constant currents.

Embodiment 6

Figure 7:
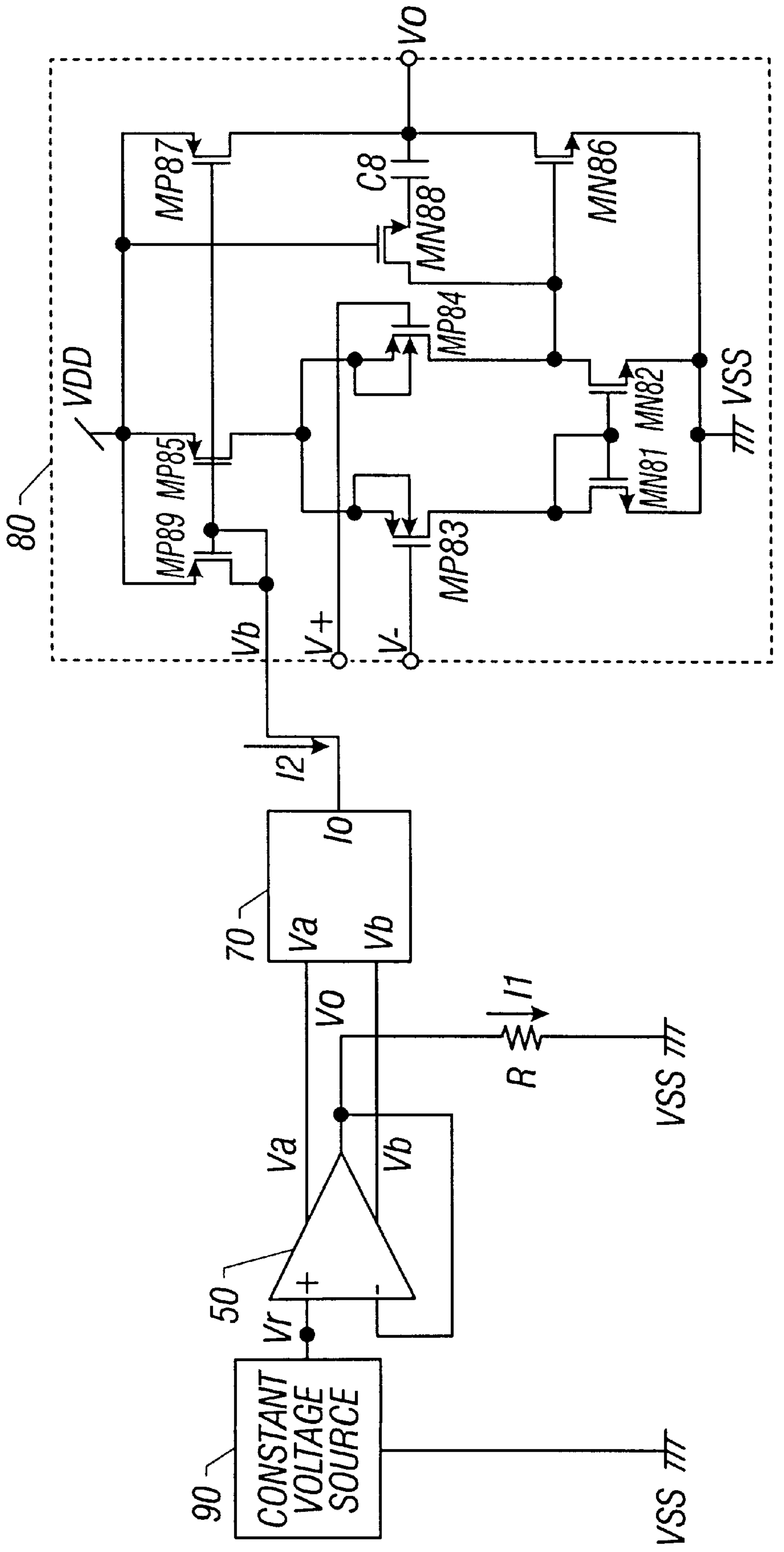
FIG. 7 is a circuit diagram showing the voltage-current converter of the sixth embodiment of this invention.

FIG. 7 shows the voltage-current converter of the sixth embodiment of this invention. The constant voltage Vr generated in constant voltage source 90 is supplied to non-reversing input of op-amp 50. The output Vo of op-amp 50 is connected with resistance R and connected with the reversing input of op-amp 50. The gate voltage Va of the P channel MOS transistor which includes the output circuit of op-amp 50 is outputted, and is supplied to the constant current generation circuit 70. Similarly, the gate voltage Vb of N channel MOS transistor which includes the output circuit of op-amp 10 is outputted, and is supplied to the constant current generation circuit 30.

The output current I2 of this embodiment 6 is the opposite direction the output current of embodiment 1 shown in FIG. 1, and is drawing current. As the example of the load which operates by this drawing current I2 being supplied, op-amp 80 shown in FIG. 7 is a basic CMOS composition formed on PMOS substrate.

Figure 8:
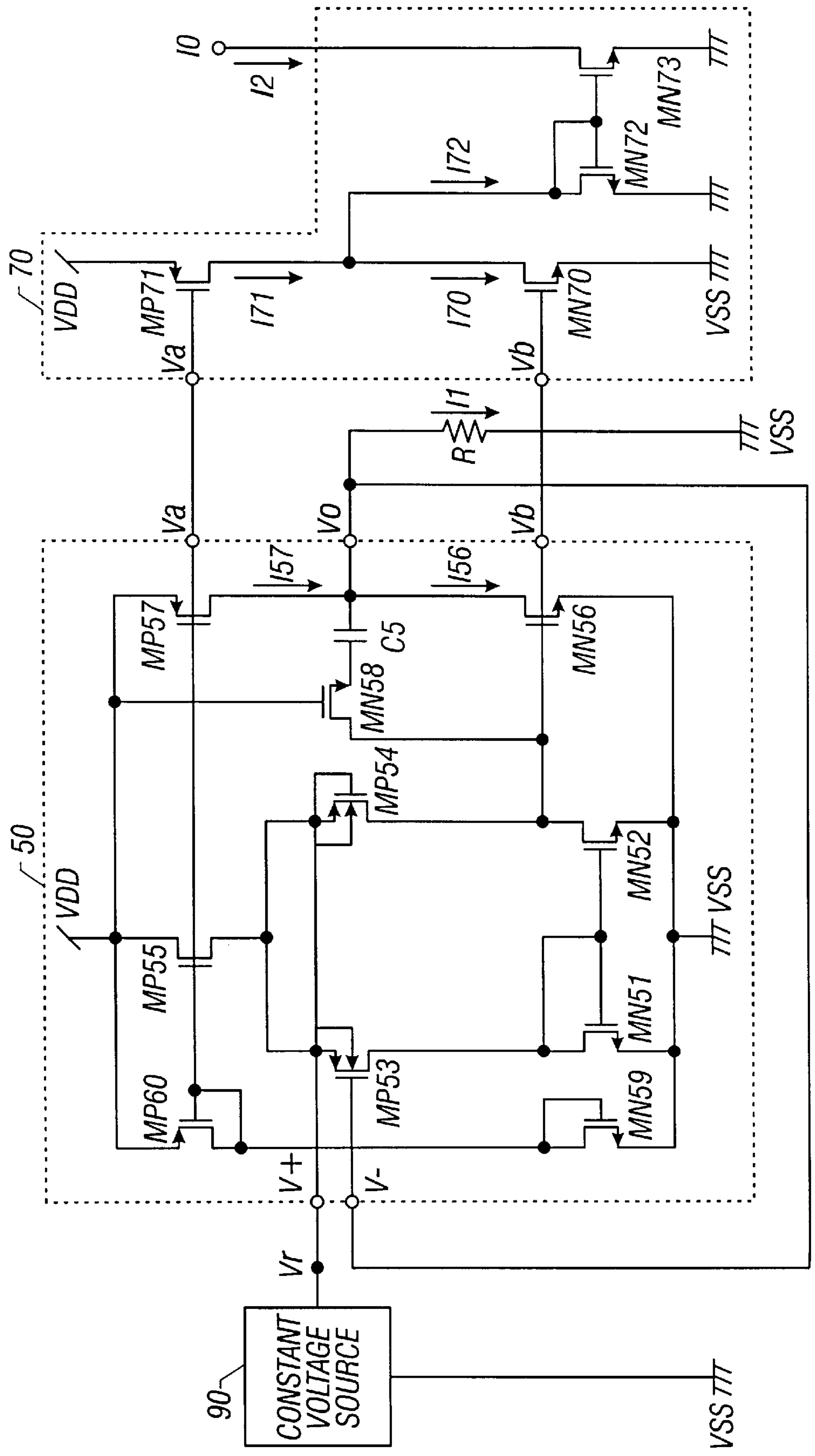
FIG. 8 is a detailed circuit diagram of the voltage-current converter in FIG. 7.

FIG. 8 shows a detailed circuit diagram of the above-mentioned voltage-current converter. The op-amp 50 includes basic CMOS formed on PMOS substrate. The gate voltage Va of the MP57 and the gate voltage Vb of the N channel MOS transistor MN56 which form the output circuit of op-amp 50 is outputted from op-amp 50, and is inputted to the constant current generation circuit 70. The constant current generation circuit 70 has the MOS transistors MN70 and MP71 whose W/L is same as that of MN56 and MP57 which form the output circuit of the op-amp 50, and whose source voltage and gate voltage connected to the same voltage potential (VSS or VDD) respectively. And, common drain of MN70 and MP71 is connected with the reference node of MOS transistors MN72 and MN73 which form the current mirror circuit. The output node of the current mirror circuit is connected with the output terminal Io of the constant current.

The voltage-current converter of this sixth embodiment is not prone to oscillation and provides the operation stability because it has a negative feedback composition in which the output Vo of op-amp 50 is connected directly with the reversing input of the op-amp 50, that is, it has a voltage follower composition. Therefore, the capacitor connected in parallel with conventionally necessary resistance R to prevent oscillation operates as shown in this embodiment. In this embodiment, the op-amp 50 operates as shown by (equation 30).

$$Vr=Vo \qquad \text{(equation 30)}$$

Moreover, current I1 which flows to resistance R is shown by the next (equation 31).

$$I1=Vo/R \qquad \text{(equation 31)}$$

The drain current of MN56 and MP57 in the op-amp 50 is denoted by I56 and I57 respectively, and current which flows to resistance R connected between the output terminal Vo of op-amp 50 and the VSS is denoted by I1, the relation between these three currents is shown by (equation 32).

$$I57=I56+I1 \qquad \text{(equation 32)}$$

Similarly, the drain current of MN70 and MP71 in the constant current generation circuit 70 is denoted by I70 and I71 respectively, and current which flows into the reference node of the current mirror circuit is denoted by I72, the relation between these three currents is shown by (equation 33).

$$I71=I70+I72 \qquad \text{(equation 33)}$$

Moreover, the current which flows into the output node of the current mirror circuit is equal to the current I72 which flows into the reference node, and this becomes the output current I2 of constant current generation circuit 70. In short, (equation 34) can be satisfied.

$$I72=I2 \qquad \text{(equation 34)}$$

As mentioned above, because the source voltage, the gate voltage and W/L of MN70 and MN71 are the same as that of the MN56 and MP57, the relation of I56, I57, I70 and I71 is shown by (equation 35).

$$I70=I56 \quad \text{(equation 35)}$$

$$I71=I57 \quad \text{(equation 36)}$$

Equation 37 is obtained from (equation 30) to (equation 36).

$$I2=Vr/R \quad \text{(equation 37)}$$

Thus, the voltage-current converter of this sixth embodiment can draw constant current I2 from the constant voltage Vr.

In the above-mentioned description, with regard to both MN56 and MN70, and both MP57 and MP71, both W/L are the same. However, there is no need to limit the W/L to the same, it is enough if the relation (W/L)=m·(W/L) is satisfied (m stands for the real number). The output current I2 can, therefore, be described by the next equation.

$$I2=m\cdot(Vr/R) \quad \text{(equation 38)}$$

In this case, output current equal to m times the current which flows to resistance R can be obtained.

Embodiment 7

Figure 9:
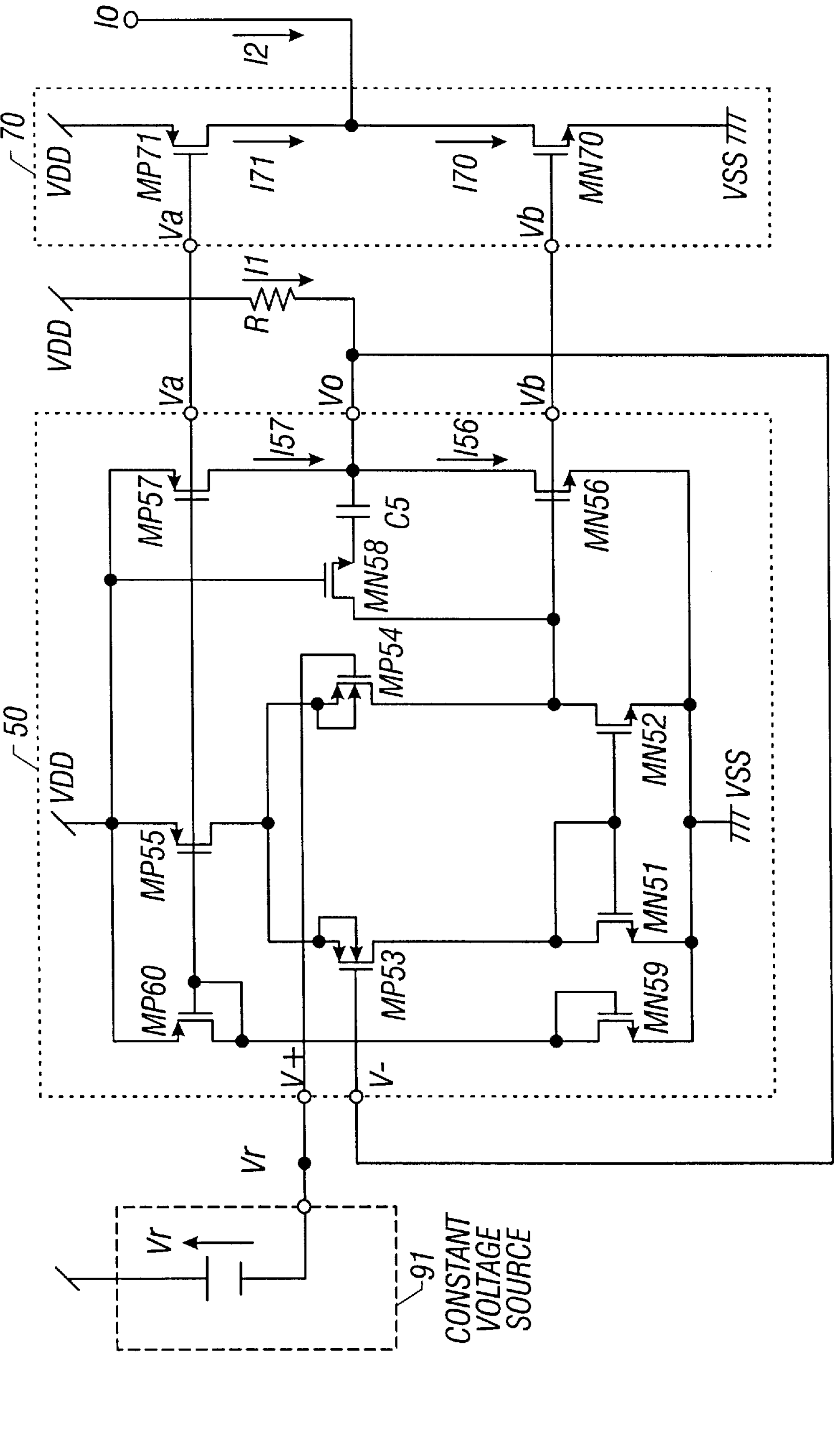
FIG. 9 is a circuit diagram showing the voltage-current converter of the seventh embodiment of this invention.

FIG. 9 shows details of the voltage-current converter of the seventh embodiment of this invention. This seventh embodiment differs from the above-mentioned embodiment, the constant voltage source 91 generates constant voltage Vr between power-supply voltage VDD on a high-level side. The voltage Vr which the constant voltage source 91 generates is supplied to the non-reversing input of the op-amp 50. The output Vo of the op-amp 50 is connected with one side of the resistance R and connected with the reversing input of the op-amp 50. The other side of the resistance R is connected with power-supply voltage VDD on a high-level side, and the current which flows to resistance R flows from VDD into the output Vo of op-amp 50. The direction of current I2 of constant current generation circuit 70 output from the constant current output terminal Io is the same as that of the current which flows to resistance R.

The voltage-current converter of this seventh embodiment operates as follows. First, the op-amp 50 operates as shown in (equation 39) because the output Vo is fed back to the reversing input directly.

$$Vr=Vo \quad \text{(equation 39)}$$

Moreover, current I1 which flows to resistance R is shown by equation 40.

$$I1=Vo/R \quad \text{(equation 40)}$$

The drain current of MN56 and MP57 in the op-amp 50 is denoted by I56 and I57 respectively, and current which flows to resistance R is denoted by I1, the relation between these three currents is shown by (equation 41).

$$I57+I1=I56 \quad \text{(equation 41)}$$

Similarly, the drain current of MN70 and MP71 in the constant current generation circuit 70 is denoted by I70 and I71 respectively, and output current of the constant current generation circuit 70 is denoted by I2, the relation between these three currents is shown by (equation 42).

$$I71+I2=I70 \quad \text{(equation 42)}$$

Because the W/L of the MOS transistors MN70 and MP71 which form the constant current generation circuit 70 is the same as that of the MOS transistors MN56 and MP57 which form the op-amp 50, and because the same source voltage and the gate voltage are applied to both sets of transistors, the relation of the drain current I56, I57, I70 and I71 of the respective MOS transistors are shown by (equation 43, 44).

$$I70=I56 \quad \text{(equation 43)}$$

$$I71=I57 \quad \text{(equation 44)}$$

Equation 45 can be obtained from (equation 39) to (equation 44).

$$I2=Vr/R \quad \text{(equation 45)}$$

Therefore, the voltage-current converter of this seventh embodiment can obtain the constant current I2 from constant voltage Vr.

In the above-mentioned description, with regard to both MN56 and MN70, and both MP57 and MP71, both W/L are the same. However, there is no need to limit the W/L to the same, it is enough if the relation (W/L)=m·(W/L) is satisfied (m stands for the real number). The output current I2 can, therefore, be described by the next equation.

$$I2=m\cdot(Vr/R) \quad \text{(equation 46)}$$

In this case, output current equal to m times the current which flows to resistance R can be obtained.

Embodiment 8

Figure 10:
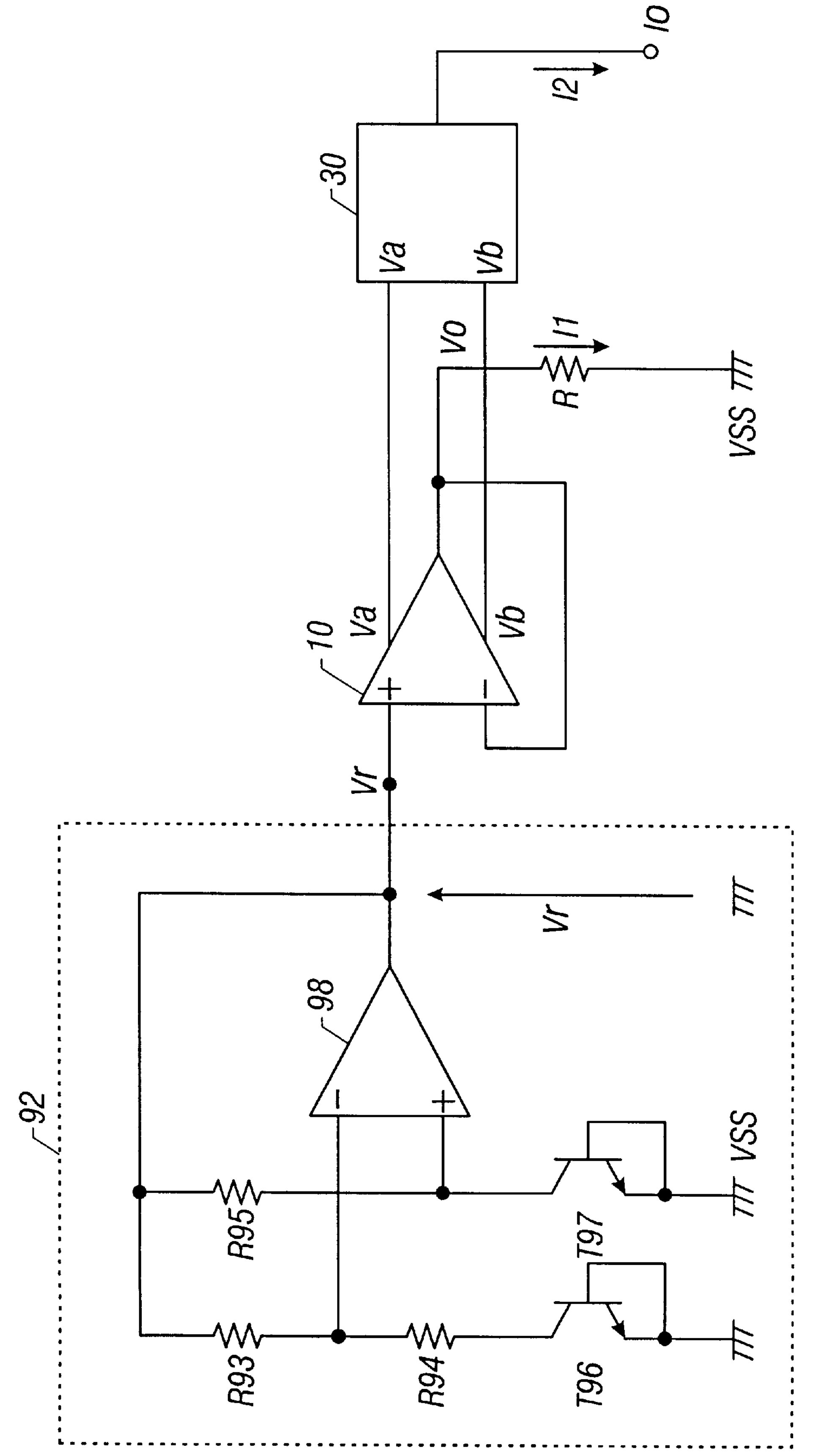
FIG. 10 is a circuit diagram showing the voltage-current converter of the eighth embodiment of this invention.
Figure 11:
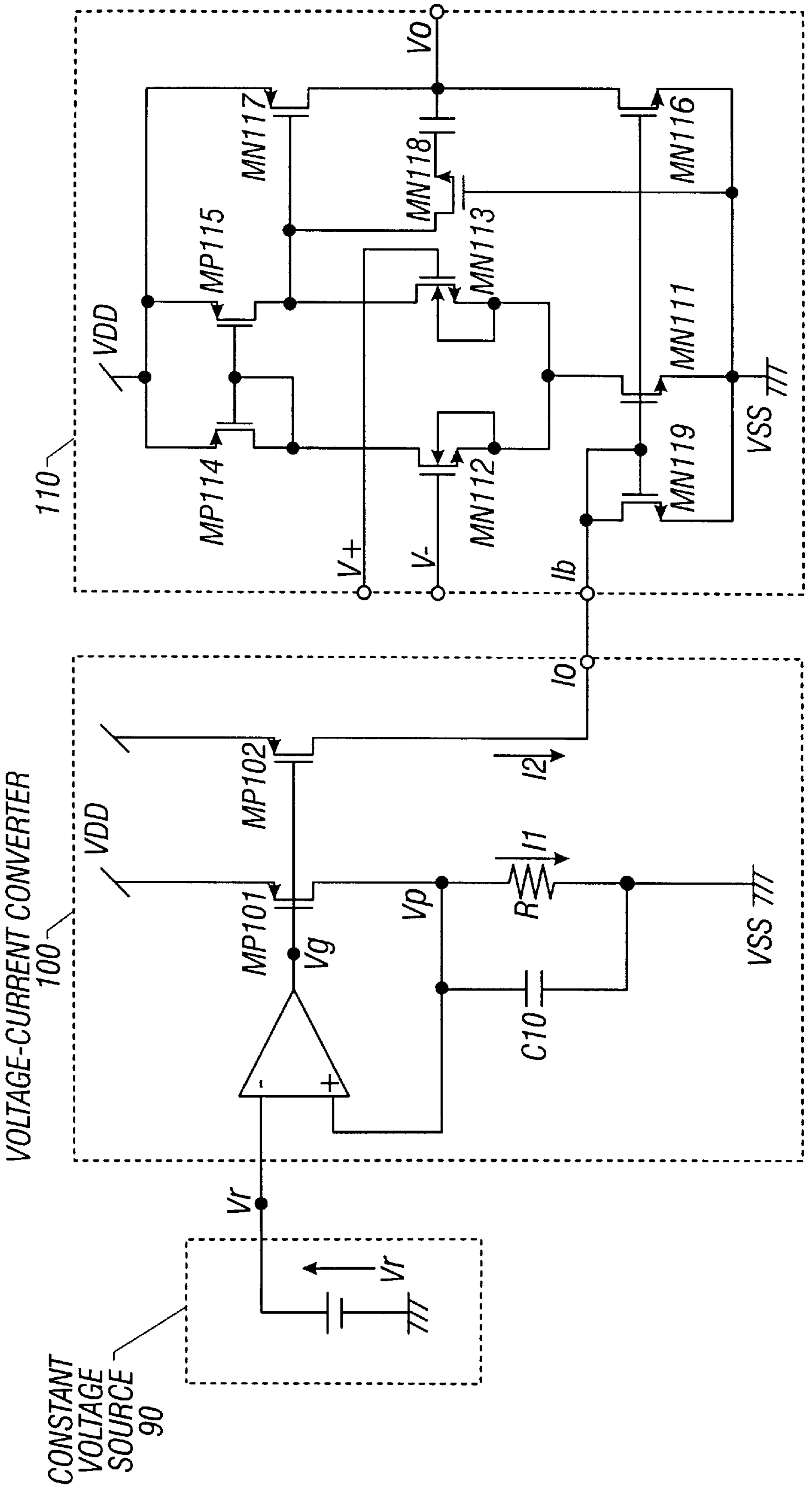
FIG. 11 (Prior Art)
FIG. 11 is a circuit diagram of a conventional voltage-current converter.

FIG. 10 shows details of the voltage-current converter of the eighth embodiment of this invention. In FIG. 10, constant voltage source 92 includes a band gap reference (Hereafter, referencing as "BGR") circuit which forms parasitic-lateral type NPN bipolar transistor to the basic CMOS circuit formed on NMOS substrate. The output voltage Vr reaches an almost constant value for the temperature change, and the BGR circuit can usually suppresses the voltage fluctuation within the range of tens of ppm/°C. level. The voltage-current converter of this eighth embodiment can achieve constant current output having very small temperature dependency by adding the BGR circuit to the constant voltage source 92.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A voltage-current converter comprising:

an input from a constant voltage source;

an op-amp to whose non-reversing input the constant voltage source is inputted and to whose reversing input terminal an output signal of the op-amp is fed back, the op-amp comprising a first transistor and a second transistor;

a resistance one terminal of which the output signal of the op-amp is inputted and the other terminal a base voltage of the constant voltage source is inputted;

a third transistor and a fourth transistor connected in parallel to the first transistor and the second transistor of the output circuit of the op-amp respectively, wherein a gate of the third transistor is connected to a gate of the first transistor, a gate of the fourth transistor is connected to a second transistor; and an output current which is obtained from connected drain terminals of the third transistor and fourth transistor.

2. The voltage current converter according to claim 1, wherein the voltage-current converter further comprises plural pairs of transistors for a CMOS circuit connected parallel to the gate of the first transistor and the second transistor, one gate of a first pair of the transistors is connected to the gate of one of the transistors of a second pair of transistors and the gate of the other transistor of the first pair of transistors is connected to the gate of the other transistor of the second pair of transistors, the drains of the first pair of the transistor are connected commonly at a connection point, and the drain of the one transistor of the second pair of transistors is connected to the collector of the other transistor of the second pair of transistors.

3. The voltage-current converter according to the claim 2, the voltage-current converter further comprises a switch to switch a status of at least one transistor of each pair of transistors to an active status or non active status by a gate voltage control, and a current controller to change the output current from the drain connection terminal.

4. The voltage-current converter according to the claim 1, wherein the resistance connected between the output of the op-amp and the base voltage of the constant voltage source is in a switching element comprising, plural sets of serially connected units, a first unit comprises a first unit transistor and the resistance, a second unit comprises a second unit transistor and a second unit resistance, the switching element is connected to, and is controlled by, a control circuit, and a combined resistance value of the resistance between the output of the op-amp and the base voltage of the constant voltage source is changed by the switching element.

5. The voltage-current converter according to the claim 1, wherein the voltage-current converter further comprises a current mirror circuit for output current reversing, the drain connection terminal of the third transistor and the fourth transistor is connected to a reference node of the current mirror circuit, the output current of the constant current is obtained from the other node of the current mirror circuit.

6. The voltage-current converter according to the claim 1, wherein the voltage-current converter uses a band gap reference circuit as the constant voltage source.

* * * * *